Patented June 1, 1937

2,082,711

UNITED STATES PATENT OFFICE 2,082,711

PROCESS OF TREATING DISTILLER'S SLOP

James Spencer McHargue, Lexington, Ky.

No Drawing. Application May 9, 1935
Serial No. 20,703

1 Claim. (Cl. 99—5)

This invention relates to a process of treating distiller's slop and to a food product derived therefrom.

Distiller's slop is a by-product derived from the fermentation and distillation of alcohol or whiskey made from grains. The slop accumulates in considerable quantities in the vicinities of large distilleries, becomes a nuisance from putrification on exposure to atmospheric conditions and offers a problem of considerable importance concerning its disposal in an economic and satisfactory way. Distiller's slop contains valuable food constituents including protein, iron, magnesium, phosphorus, calcium and manganese held in suspension, and which are lost when the slop is allowed to decompose by putrification on soil or is carried away in a stream of water.

The objects of this invention are to provide, in a manner as hereinafter set forth, a process for the treatment of the slop to recover all of its valuable food content; to produce therefrom a food which is more nutritious; to concentrate, enrich and to recover to the maximum extent the protein and mineral nutrients, consisting of compounds of calcium, magnesium, phosphorus, iron, copper and manganese which are held in solution and in colloidal suspension in distillery slop, and to prepare the solid matter thus separated and recovered from the liquid portion of said slop for food for domestic animals and man; to change the chemical reaction of distillery slop from an acid to a neutral or slightly alkaline condition by the addition of the proper amount of hydrated lime for the purpose of precipitating the protein and mineral constituents, aforementioned, which are held in colloidal suspension in the distillery slop and rendering them in a form suitable for separation from the aqueous portion of the slop; and to render the aqueous portion of distillery slop free from fermentable and putrifiable nitrogenous matter so that when the aqueous portion is run off on the soil it will be absorbed by the soil and will not putrify and produce obnoxious and foul smelling odors or be injurious to aquatic life if run into a stream of running water several times the volume of the aqueous portion of the said slop.

The process of treatment may include, as a step thereof, filtration with or without suction or pressure; filtration on a conveyor belt; filtration by means of a press; separation of the solids by sedimentation and decantation; separation of the solids by centrifugalization. The preferred embodiment of the process, in accordance with this invention, for the treatment of distiller's slop will now be referred to.

The process includes the running of the hot thick slop, after the alcohol and other volatile constituents have been distilled off, into a tank of the proper size from which it is passed over one or more metal screens that removes approximately one-half of the solids that were in suspension in the thick slop. The resulting thin slop from the screens, containing about three percent of total solids, is run into a second tank of the desired size. To the thin slop there is gradually added finely pulverized hydrated calcium oxide which is thoroughly mixed with the thin slop during the agitation of the latter until the reaction of the slop becomes faintly alkaline, as shown by the use of red litmus or the indicator phenolphthalein. The slop is run from the second tank onto a filter of the desired size and form to remove and recover from the thin slop the valuable food constituents precipitated by the addition of hydrated lime to a slightly alkaline reaction. The filtering element of this filter preferably will consist of a U-shaped perforated conveyor belt which is lined and fitted with paper and cotton or linen filtering cloth arranged throughout the inner side so as to form a filter which retains thereon the valuable food content, including protein and compounds of calcium, magnesium, iron and phosphorus and permits the filtrate to run through and drain off. The said food content recovered from the thin slop is then transferred from the conveyor belt to and mixed with the solids collected on the metallic screens, from the thick slop. The mixture is then dried in a rotating drum by means of steam and a current of air.

The action of the filter upon the thin slop provides a filtrate in the form of a perfectly clear straw colored solution which is run into a third tank of the desired size. Suitable portions of the clear filtrate are drawn off into tanks of the proper size and form, and portions are treated with a mineral acid to acid reaction and with ethyl ether or other suitable solvent which is added to the filtrate while the latter is agitated. The ether layer and aqueous portion are separated and lactic acid or any other acid contained therein of commercial importance is recovered from the ether extract. The residue of the filtrate may be run off into a stream of running water or on the soil without contaminating or polluting the soil or water to a harmful degree, and on exposure to atmospheric conditions it will not putrify and produce foul and obnoxious odors.

*Chemical analyses of un-treated and treated distillery slop*

Untreated thin slop contains: 3.5% total solids; the total solids contains 3.88% nitrogen, (equivalent to 24.25% protein); and 6.33% ash.

Treated slop yields a precipitate and when separated from the liquid portion and dried at 100° C. contains 5.42% nitrogen; (equivalent to 33.84% protein); and 16.00% ash. The ash contains the following important mineral nutrients: silicon, 0.22%; copper, 0.018%; manganese, 0.008%; iron, 0.179%; aluminum, 0.011%; calcium, 0.494%; magnesium, 0.300% and phosphorus, 1.114%. These elements occur in much larger amounts in the precipitate from the treated slop than they do in the residue when the untreated slop is evaporated to dryness at 100° C. Therefore, the treatment with hydrated lime concentrates and enriches both the protein and valuable mineral nutrients contained in the thin slop.

The process not only provides a new efficient and more complete recovery of, but also enriches the products of value contained in thin distillery slop to a greater degree than any process heretofore known. Furthermore, no unnecessary inert constituent or harmful ingredient has been added to or is produced in the feed, recovered from the distillery slop by the process.

By using the process, the valuable food constituents and other by-products of value which are contained in distillery slop are more completely removed, economically recovered and enriched by this invention than by any process heretofore known.

What I claim is:

In a process of producing a food product from distiller's slop, distilling off the volatile constituents from the slop, then filtering, while hot, the slop, to collect a portion of the solids thereof and to form a thin slop, then making the thin slop faintly alkaline, then filtering, in the presence of hydrated lime, the alkalined thin slop to collect from the latter the food constituents carried thereby, then thoroughly combining the collected food constituents and the collected solids to form the food product in a moist state, and then drying the moist food product to complete the latter.

JAMES S. McHARGUE.